Nov. 10, 1959     A. L. SCOTT     2,912,102
PACKAGE FOR FISHING LINE
Filed July 29, 1958
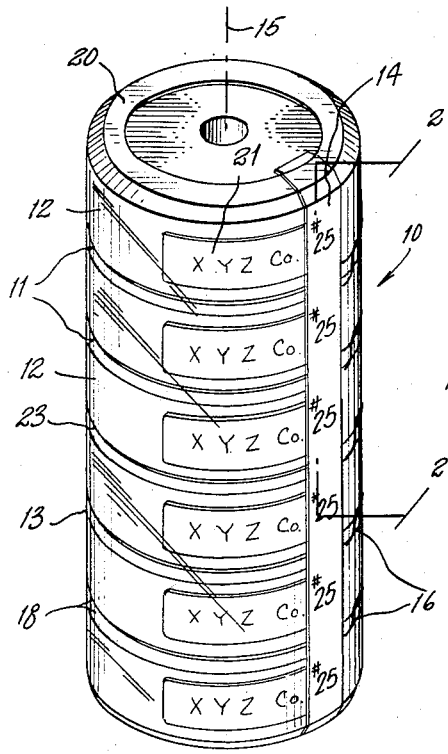
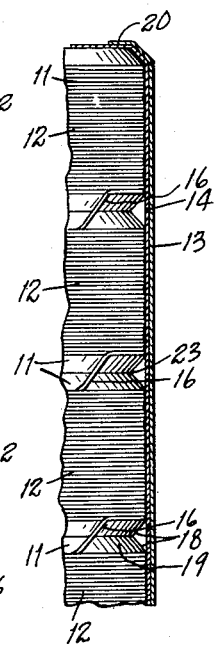
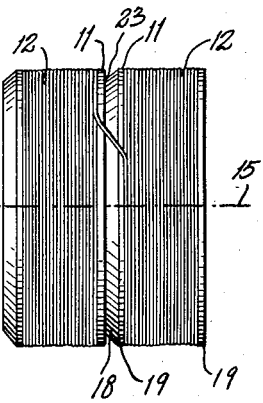
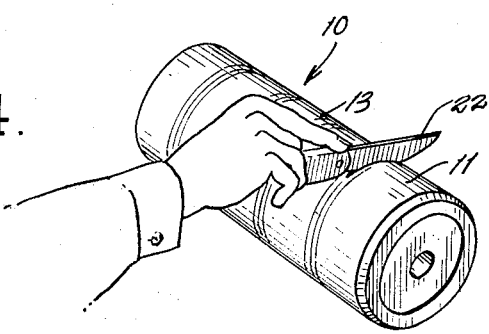
INVENTOR.
ARTHUR L. SCOTT
BY
ATTORNEYS

United States Patent Office 2,912,102
Patented Nov. 10, 1959

2,912,102

PACKAGE FOR FISHING LINE

Arthur L. Scott, Columbia, S.C., assignor to Soo Valley Company, Columbia, S.C., a corporation of Iowa Application July 29, 1958, Serial No. 751,769

5 Claims. (Cl. 206—56)

This invention relates to packages for spooled fishing line.

Fishing line is often wound on spools for sale and the spools of line are usually further packaged in small cardboard boxes generally with several spools to the package. Each spool usually carries a convenient standard length of line, but since many times fishermen want a line longer than this standard length, such a line is wound successively and continuously on several spools and is not cut therebetween. For example, a one hundred foot line may be wound fifty feet on a first spool and thence wound fifty feet on a second spool without cutting the line between the two. The two spools thus connected by a short length of line running between them are packaged together in a box for sale either together as a one hundred foot line or singularly as two fifty foot lines. In the latter case, the vendor removes both spools from the box and separates the spools from each other by cutting the line connecting the two. When lines are spooled and packaged in this way the line on each spool is looped under the last turn to prevent unspooling. This type of spooling cannot be done continuously because of the necessity for forming a loop to anchor the line on each spool and the packages are not desirable or attractive when one spool alone is purchased from the package.

It is therefore an object of the present invention to provide a new and improved line package for spooled lines which is attractive and economical and which overcomes the aforesaid disadvantages.

Another object is to provide such a package which has many advantages for labeling and display but in which the line may be easily separated in individual spools without destroying the attractiveness of the package.

Another object is to provide such a package which is economical and easy to produce.

Other objects and advantages of the invention will appear from the following specification and from the drawings which illustrate a preferred form of the invention, and in which:

Figure 1 is a perspective view of a package made in accordance with the invention;

Figure 2 is a partial sectional view taken at line 2—2 in Figure 1 to show the invention in more detail, and to show a preferred form of spool adapted for practicing the invention;

Figure 3 shows a front view of two contiguous spools of slightly different form and adapted for practicing the invention; and Figure 4 shows a manner in which spools may be severed from the package.

Generally described, the invention consists of a package comprising a plurality of spools of fishing line axially aligned end to end whereon the line is wound continuously and without cutting or severing between spools. Each spool is provided with a bevel extending circumferentially along an exterior edge of the side flange thereof, and preferably both side flanges, so as to provide a V-shaped groove between the spools as they are juxtaposed with coinciding central axes within the package. As wound in continuous fashion, the fishing line will pass from one spool to an adjacent spool across the said V-shaped groove, the line thereby being conveniently located and suspended thereacross. A wrapping, preferably transparent, is superposed about the plurality of juxtaposed spools to form a package of contiguous spools so that each of the spools may be cut or severed therefrom by passing a knife through the wrapping and around the package at the area of the V-shaped groove between the spools so that the groove guides the knife during the operation and facilitates the concurrent severing by the knife of the wrapping and fishing line passing thereacross.

Referring to the drawings, the numeral 10 indicates a package made in accordance with the invention. Package 10 is generally comprised of a plurality of spools 11 each having fishing line 12 wound thereon, and a wrapping 13 superposed annularly about the plurality of spools. A label 14 may be interposed between wrapping 13 and spools 11, carrying, for instance, the weight of the line or its strength in pounds.

Each of the spools 11 within the package 10 are juxtaposed one to another so that the central axes 15 of each of the spools 11 coincide. The fishing line 12 on each of the spools 11 is wound continuously therebetween, the line passing from one spool to an adjacent spool as indicated at 16.

Each of the spools 11 is provided with a circumferentially extending bevel 18 on a flange 19 thereof, as shown in Figure 3, and preferably on both flanges thereof, as shown in Figure 2.

Wrapping 13 is preferably of transparent plastic material such as that known as "Cello Seal," or a similar transparent plastic material, which after superposition about the juxtaposed spools may be shrunk-fit therearound so as to tightly hold the spools in juxtaposition. This material is often applied in a moist form and it shrinks on drying and tightly embraces the stack of spools.

Prior to superposing wrapping 13 about the spools 11, label strip 14 may be applied directly to the spools 11 in the manner shown in Figures 1 and 2. Label 14 may be in the form of a continuous strip-label extending across all of the plurality of spools 11 in the package 10. Legends or other identifying indicia for each spool may appear on label 14 being spaced apart thereon, as shown in Figure 1. When this type of label is employed the strength of the line may be indicated repeatedly on the strip so that after severing an individual spool each spool still carries this information, and the outer wrap may be one which is general in its application and which has imprinted on it, as indicated at 21, a house trademark or other general identifying symbol. It is thus not necessary to have an outer wrap for each length or strength of line, greatly simplifying the packaging operation and reducing inventory.

After package 10 has been assembled as aforesaid, it will have the general form of a cylinder or stack of contiguous spools of fishing line. The package may be placed in upright position, as shown in Figure 1, on the vendor's shelf to display the spools in attractive manner.

When it is desired to remove a spool, or several spools as a unit from the package 10, the spool or spools are severed from the package by means of a knife 22, or similar instrument, being drawn around the package between the spools to cut the wrapping 13, the label 14, and the line connection 16. Knife 22 will be guided in its travel around the package by V-shaped groove 23 formed by the juxtaposition of the bevels 18 on each of the spools 11. The V-shaped groove 23 will further assist the cutting action of knife 22 by providing free suspension of the wrapping 13, the label 14 and the line connection 16 in the area to be cut. When severing the spools 11 from the package 10, the package may be placed on its side to facilitate cutting with knife 22, as shown in Figure 4, or package 10 may be held in substantially upright position in one hand to be cut by knife 22 held in the other.

When the spools 11 have been severed from the package, shrunken wrapping on the individual spool will prevent unwinding of the fishing line 12 from the spools, and the looping of the fishing line on each spool, as was the practice heretofore, is unnecessary. This is of great value since by eliminating the looping it is possible to merely mount a stack of spools on a winding mandrel and the wrapping can be a continuous operation.

In this package the fishing line may be wound continuously over all of the spools and wrapped without danger of the line becoming unwrapped upon removal of a single spool or stack of spools from the package. Furthermore, the fishing line is provided in continuous length greater than that which is standard for winding on each spool in the package. The package is useful as an attractive display for the merchandise contained therein and may be easily and economically assembled, and is easily opened for removal of the merchandise.

While the invention as described is particularly useful in the packaging of fishing line, it is to be understood that it is useful in the packaging of many other and similar types of merchandise without departing from the principle thereof.

What is claimed is:

1. A package for fishing line or the like comprising a plurality of flanged spools stacked end to end on a common axis, each spool having an outwardly facing peripheral bevel on at least one of its flanges to form a groove between spools, a single length of line wound on said spools filling each spool and then extending to the next spool over said groove, a strip of labels extending longitudinally of said stack and overlying said spools with a label at each spool, and means for holding said spools rigidly in assembled position comprising a tight fitting transparent overwrap comprising a tube shrunk in position and overlying and tightly holding said labels and said line whereby a spool or spools may be separated from said package by a knife guided by said groove to cut overwrap and line and label strip and whereby the severed spool or spools remain tightly wrapped with the label in place and the line held against the spool by the wrapping.

2. A package for fishing line or the like comprising a plurality of flanged spools stacked end to end on a common axis, each spool having an outwardly facing peripheral bevel on at least one of its flanges to form a groove between spools, a single length of line wound on said spools filling each spool and then extending to the next spool over said groove, and means for holding said spools rigidly in assembled position comprising a tight fitting transparent overwrap comprising a tube shrunk in position and overlying and tightly holding said line whereby a spool or spools may be separated from said package by a knife guided by said groove to cut overwrap and line and whereby the severed spool or spools remain tightly wrapped with the line held against the spool by the wrapping.

3. A package for fishing line or the like comprising a plurality of flanged spools stacked end to end on a common axis, each spool having an outwardly facing peripheral bevel on at least one of its flanges to form a groove between spools, a single length of line wound on said spools filling each spool and then extending to the next spool over said groove, a strip of labels extending longitudinally of said stack and overlying said spools with a label at each spool, and means for holding said spools rigidly in assembled position comprising a tight fitting transparent overwrap overlying and tightly holding said labels and said line whereby a spool or spools may be separated from said package by a knife guided by said groove to cut overwrap and line and label strip and whereby the severed spool or spools remain tightly wrapped with the label in place and the line held against the spool by the wrapping.

4. A package for fishing line or the like comprising a plurality of flanged spools stacked end to end on a common axis, each spool having an outwardly facing peripheral bevel on at least one of its flanges to form a groove between spools, a single length of line wound on said spools filling each spool and then extending to the next spool over said groove, and means for holding said spools rigidly in assembled position comprising a tight fitting transparent overwrap overlying and tightly holding said line whereby a spool or spools may be separated from said package by a knife guided by said groove to cut overwrap and line and whereby the severed spool or spools remain tightly wrapped with the line held against the spool by the wrapping.

5. A package for fishing line or the like comprising a plurality of flanged spools stacked end to end on a common axis, each spool having an outwardly facing peripheral bevel on at least one of its flanges to form a groove between spools, a single length of line wound on said spools filling each spool and then extending to the next spool over said groove, and means for holding said spools rigidly in assembled position comprising a tight fitting overwrap overlying and tightly holding said line whereby a spool or spools may be separated from said package by a knife guided by said groove to cut overwrap and line and whereby the severed spool or spools remain tightly wrapped with the line held against the spool by the wrapping.

References Cited in the file of this patent

UNITED STATES PATENTS

| | | |
|---|---|---|
| 1,338,315 | McAuliffe | Apr. 27, 1920 |
| 1,468,994 | Cook | Sept. 25, 1923 |
| 2,581,561 | Shaw | Jan. 8, 1952 |